(12) United States Patent  
Boonekamp et al.

(10) Patent No.: US 7,943,940 B2  
(45) Date of Patent: May 17, 2011

(54) LED-ARRAY SYSTEM

(75) Inventors: Erik Boonekamp, Eindhoven (NL); Adriaan Valster, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2 days.

(21) Appl. No.: 12/599,333

(22) PCT Filed: May 5, 2008

(86) PCT No.: PCT/IB2008/051721  
§ 371 (c)(1),  
(2), (4) Date: Nov. 9, 2009

(87) PCT Pub. No.: WO2008/139353  
PCT Pub. Date: Nov. 20, 2008

(65) Prior Publication Data  
US 2010/0237365 A1 Sep. 23, 2010

(30) Foreign Application Priority Data  
May 10, 2007 (EP) .................................. 07107904

(51) Int. Cl.  
*H01L 33/00* (2010.01)

(52) U.S. Cl. ............. 257/88; 257/99; 257/100; 257/787

(58) Field of Classification Search .................... 257/88, 257/99, 100, 787  
See application file for complete search history.

(56) References Cited

U.S. PATENT DOCUMENTS

| 5,973,336 | A | 10/1999 | Hanke et al. |
| 6,379,016 | B1 | 4/2002 | Boyd et al. |
| 6,742,907 | B2 | 6/2004 | Funamoto et al. |
| 2006/0115214 | A1 | 6/2006 | Cassarly |
| 2006/0284203 | A1 | 12/2006 | Han et al. |
| 2007/0002565 | A1 | 1/2007 | Han et al. |
| 2007/0019394 | A1 | 1/2007 | Park et al. |

FOREIGN PATENT DOCUMENTS

| EP | 1437215 A1 | 7/2004 |
| EP | 1486818 A2 | 12/2004 |
| EP | 1521235 A2 | 4/2005 |
| EP | 1701204 A1 | 9/2006 |
| WO | 2004009349 A1 | 1/2004 |
| WO | 2005001331 A1 | 1/2005 |

*Primary Examiner* — Long Pham

(57) ABSTRACT

A LED-array system comprises at least one LED package 104 arranged on a substrate 106 provided with means for supplying the LED package 104 with a drive voltage. The LED package 104 is immersed in a supporting layer 112, and the system is characterized in that the at least one LED package 104 comprises a side-emitting LED package, for emission flight essentially parallel to a surface of the substrate 106 and that the system comprises at least one out coupling structure 116 reflecting/scattering the emitted light out of the supporting layer 112.

8 Claims, 3 Drawing Sheets

US 7,943,940 B2

LED-ARRAY SYSTEM

FIELD OF THE INVENTION

The present invention relates to Light Emitting Diode (LED) packages incorporated in glass-like material.

BACKGROUND OF THE INVENTION

Light emitting elements comprising Light Emitting Diode (LED) packages incorporated in glass are currently fabricated for architectural purposes. In these elements, two-dimensional LED arrays are sandwiched between two glass plates laminated by a polymer, usually PVB (polyvinylbutyral). The LED packages are fixed on one glass plate on which a pattern of conductors is present to provide the current for the LED packages. The above construction is beneficial since it imparts durability to the construction, so that the field of use increases.

A problem that is present for LEDs fully immersed in a glass like medium is that total internal reflection (TIR) occurs at the interface between the glass surface and the surrounding air. A consequence is that light with angles larger than the critical angle is totally reflected at the glass/air interface, resulting in an optical efficiency of about 41%. The totally reflected light is absorbed in the glass/PVB/glass system (after multiple internal reflections). A further problem is that the brightness of LED packages is high (1-10 MCd/m$^2$), which results in that for instance glass walls incorporating LED packages exhibit a low visual comfort with multiple glaring light sources. Furthermore, commercially available top-emitting LED packages are typically quite thick (>0.8 mm), and consequently the PVB layer needs to be thick. This results in an increased cost and contributes to a brownish color of the glass structure, due to the optical properties of PVB. In the case of an isolated LED packages in a large glass stack all totally reflected light is finally absorbed. In addition, at relatively high LED package densities (e.g. >0.5 cm$^{-2}$) totally reflected light could scatter at neighboring packages, leading to unpredictable light outcoupling.

The present invention aims at alleviating the above drawbacks in prior art systems.

SUMMARY OF THE INVENTION

The present invention aims at alleviating the above problems by the provision of a LED-array system in accordance with claim 1.

The LED-array system is characterized in that the at least one LED package comprises a side-emitting LED package, for emission of light essentially parallel to a surface of the substrate and that the system comprises at least one outcoupling structure reflecting/scattering the emitted light out of the supporting layer.

The inventive LED-array system effectively couples light out, and hence increases the optical efficiency as compared to conventional systems. The use of outcoupling structures, effectively forming virtual light sources, is a convenient way of reducing annoying high brightness by facilitating the distribution of light (originating from a few LED packages with high brightness) over a large array of virtual light sources. The use of side-emitting LED packages, because they are thinner than top-emitting LED packages, decreases the required amount of material in the supporting layer. This reduces costs as well as improves the visual appearance of the LED-array system. Also, the use of outcoupling structures provides a versatile and flexible system that is easily adapted for a specific application.

In one or more embodiments a top layer may be arranged in such a way that it sandwiches said supporting layer between the top layer and the substrate. The top layer may serve as a protection against damage in order to increase the lifetime of the LED-array system. The resulting transparent luminaire is visually attractive and the inventive system makes it possible to integrate light emitting elements in transparent surfaces.

The substrate and the top layer may be made of glass and the supporting layer may be made of PVB or a resin. The combination of glass and PVB or resins is well-known within the field of laminated glass.

In one or more embodiments the outcoupling structures may be arranged on a surface of the top layer, facing the supporting layer. This arrangement makes it possible to achieve an efficient production of the LED-array system. The outcoupling structures may also be arranged on a surface of the substrate facing the supporting layer. The arrangement of outcoupling structures on this surface has a processing/production advantage since potential contamination resulting from the arrangement of the outcoupling structures will not affect the bonding of the LEDs.

The outcoupling structures may be screen printed, and the use of screen-printed structures is advantageous in terms of production speed and production costs.

There are several alternatives for the outcoupling structures, including, but not limited to, the group consisting of luminescent ink; polymer particles containing luminescent dies; interference pigments, such as TiO$_2$-coated mica flakes; high index oxides, such as ZrO$_2$; colored pigments, such as Fe$_2$O$_3$; photochromic materials; particles with closed porosity, such as hollow spheres, or any similar material or combination thereof. There are numerous alternatives for the construction of the outcoupling structures since materials that are capable of spreading, reflecting, refracting, and/or absorbing and reemitting light in a suitable fashion may be used. The distribution of outcoupling structures can e.g. be arranged to produce an even light distribution over a surface. Alternatively, they can be arranged so as to form a pattern, such as a logo, a certain shape and so forth.

In one or more embodiments a thin air gap is formed between the light-emitting face of the LED package and the supporting layer. Due to the air gap between the light emitting face of the LED package and the glass/PVB environment all light is captured in the glass/PVB/glass stack by TIR, which means that the outcoupling of light can be controlled to a higher degree. The air gap may be formed by the provision of a transparent cap over the LED package. The cap may further be formed of PMMA, glass or a ceramic material.

The LED-array system may be incorporated into an illumination system.

A method for producing a LED-array system according to the preceding description comprises the steps of:

arranging a LED package comprising a side-emitting LED package on a substrate provided with means for supplying the LED package with a drive voltage, arranging outcoupling structures in the system, applying a supporting layer of polymer over the LED package, heating the stack while applying a pressure and thus immersing the LED package in the polymer medium.

The method may also comprise the step of arranging a transparent cap so as to create an air gap between the light-emitting face of the LED package and the supporting layer and/or the step of arranging a top layer in such a way that it sandwiches the support layer between the top layer and the substrate.

DETAILED DESCRIPTION OF PREFERRED EMBODIMENTS

Figure 1:
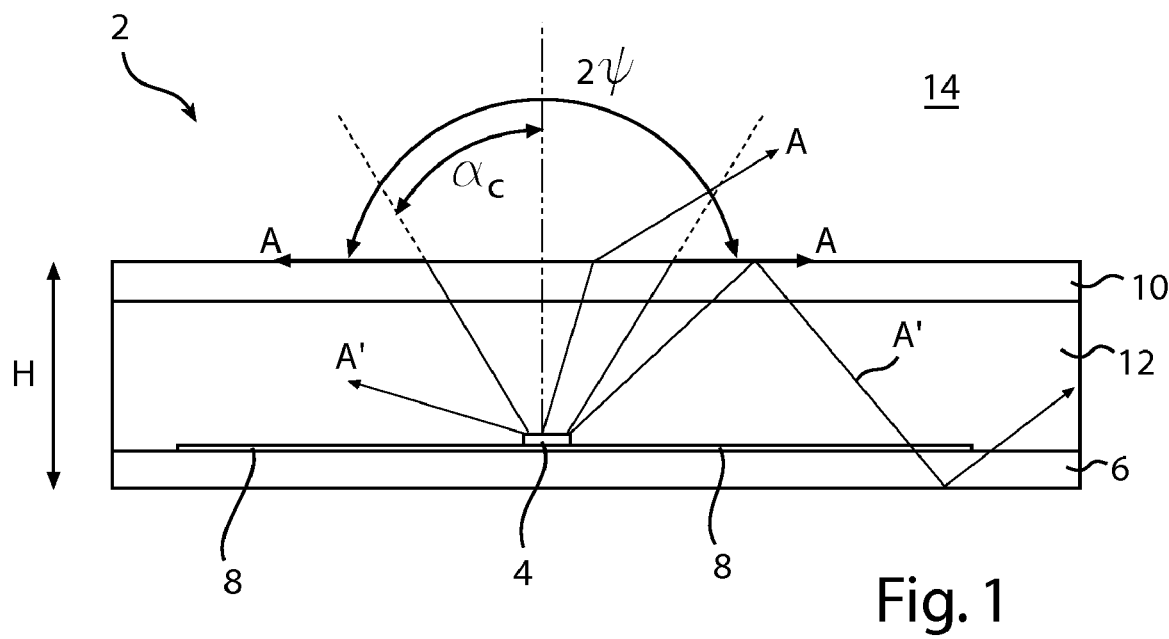
FIG. 1 is a schematic cross-sectional view of a known illumination system, using top-emitting LED packages.

FIG. 1 illustrates schematically a part of a prior art system 2 where Lambertian top-emitting LED packages 4 are arranged on a glass plate substrate 6. Transparent conductors 8, providing current to the top-emitting LED packages 4, are present on the substrate 6. The top-emitting LED packages 4 are sandwiched between the substrate 6 and a top glass plate 10 and are immersed in a polymer 12, generally polyvinylbutyral (PVB), which polymer 12 also provides for the adhesive force holding the glass plates 6, 10 together. The refractive index of PVB is similar to that of the glass and in the calculations to be described below it will be set to 1.50. The approximate height, H, of the sandwiched system is generally about 7-8 mm. The system is generally surrounded by air 14. Arrows A indicate light leaving the LED 4 and arrow A' indicates light experiencing total internal reflection.

The optical efficiency, η, that is, the amount of light leaving the top glass surface 10 divided by the total amount of light emitted from the top-emitting LED package 4, is low for the prior art system 2. The expected low optical efficiency when LED packages are immersed in a polymer/glass stack can be calculated quite easily using equation scheme 1.

$$P_1 = 4\pi \int_0^{\alpha_c} I_0 \cos(\alpha)\sin(\alpha)\,d\alpha \qquad \text{eq. 1}$$

$$P_2 = 4\pi \int_0^{\pi/2} I_0 \cos(\alpha)\sin(\alpha)\,d\alpha$$

$$\eta_{Lambertian, corrected} \approx \frac{P_1}{P_2} * \left(1 - \left(\frac{n-1}{n+1}\right)^2\right) * 100\%$$

$$\alpha_c = \arcsin\left(\frac{1}{n}\right)$$

$\alpha_c$ critical angle
$I_0$ intensity of the light emitted perpendicular to the light emitting face of the LED package (cd)
n refractive index ($n_{glass} \approx n_{PVB} = 1.50$)

For a refractive index of n~1.50, about 60% of the light is absorbed within the system for a Lambertian emitting LED. Only light within the so-called escape cone ($\alpha < \alpha_c$) contributes to the emitted flux from the prior art system 2. Most LED packages produce a wide (almost Lambertian) beam and losses are large when incorporated in high index media.

In the above situation the emitted flux is emitted over a space angle of $2\pi$. However, for illumination purposes, glare is unacceptable. In this context glare corresponds to light emitted outside of a preferred radiation cone, defined by $2\psi$ in the figures. A general guide is to keep the luminance of the illumination system below 500-1000 cd/m² for angles $\psi > 60$ degrees. For a typical LED package generating 10 lm from a surface of 5 mm², the luminance over the whole hemisphere is ~1 Mcd/m² as calculated using equation 2.

$$\frac{\Phi}{S} = \pi L \qquad \text{eq. 2}$$

Φ emitted flux (lm)
S emitting surface (m²)
L luminance (cd/m²)

Figure 2:
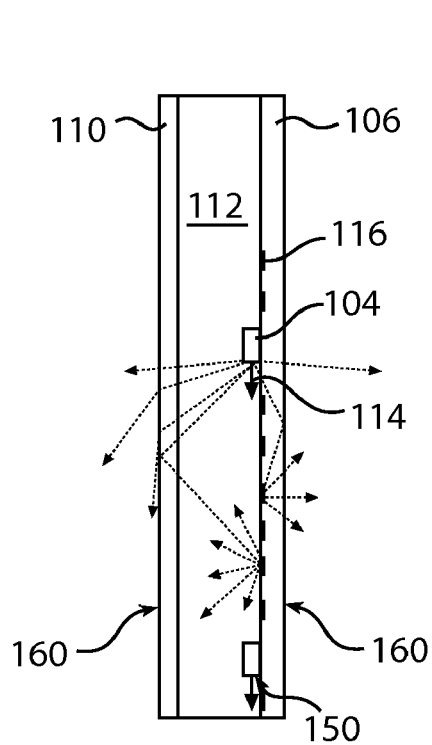
FIG. 2 is a schematic cross-sectional view of a first embodiment of the present invention.
Figure 3:
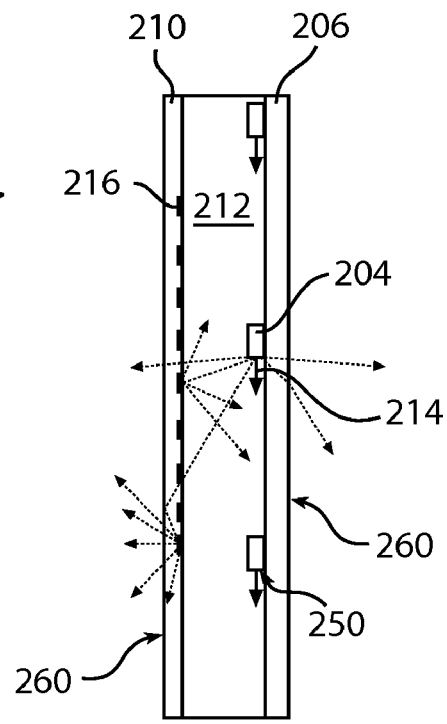
FIG. 3 is a schematic cross-sectional view of a second embodiment of the present invention.

For clarification purposes, a definition of a side-emitting LED package 104; 204 as used herein is that the light emitting plane(s) 150; 250 of the side-emitting LED package is (are) essentially and substantially perpendicular to the exit plane(s) 160; 260 of the LED-array system (FIGS. 2 & 3).

Figure 4:
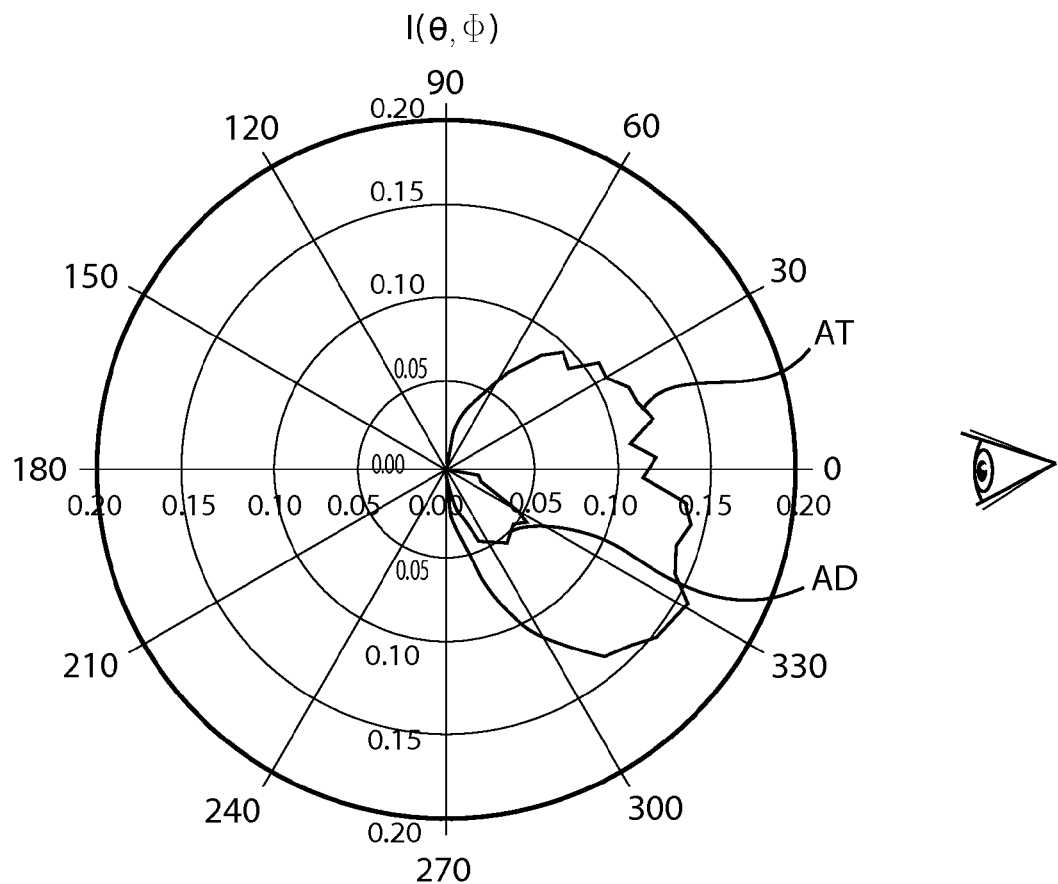
FIG. 4 is a diagram showing a typical distribution of light emitted by a side-emitting LED package incorporated into an embodiment of FIGS. 2 and 3.

A typical angle distribution of the light emitted by a side-emitting LED package 104; 204 incorporated in an LED-array system illustrated in FIGS. 2 and 3, to be described in the following, is illustrated in FIG. 4, where the zero direction corresponds to a direction parallel to the light emitting face 150; 250 of the side-emitting LED package 104; 204 and normal to the exit plane 160; 260 of the system, as viewed by the viewer illustrated in FIG. 2. In FIG. 4 only light emitted towards the side of the viewer in FIG. 2 is represented. The area indicated by AD corresponds to the amount of light that exits the system directly from the side-emitting LED package 104; 204, and the area indicated by AT indicates the total amount of light emitted from the outcoupling structures 116; 216. It is clear that the direct light AD constitutes only a small part of the total amount AT, generally not large enough to cause glare. Note that even if the brightness is still high, all light is distributed below the viewer's horizon (corresponding to 0°.

FIGS. 2 and 3 show a schematic view of a first and a second embodiment, respectively, of an inventive system. Both systems comprise two layers of glass, a substrate layer 106; 206 and a top layer 110; 210, sandwiching an intermediate supporting layer 112; 212 of polyvinylbutyral. Side-emitting LED packages 104; 204 are arranged on the substrate layer 106; 206 and power is supplied to each LED package by means of transparent conductors made of, e.g., indium tin oxide (ITO) or F-doped $SnO_2$. Alternatively, thin non-transparent conductors, such as Cu-conductors, could be used in certain applications. The conductor setup is not shown in FIGS. 2 and 3. The arrows 114; 214 indicate the direction of $I_o$, i.e. light emitted perpendicular to the light-emitting face (light generating side) 150; 250 of the side-emitting LED package 104; 204. Although most side-emitting LED packages 104; 204 emit light with a Lambertian distribution (as indicated by the dotted arrows in FIGS. 2 & 3), the main direction of the emitted light (indicated by $I_o$ and arrows 114; 214) for side-emitting LED packages is parallel to the substrate layer 106; 206.

Screen printed outcoupling structures 116; 216 made of luminescent material, such as YAG:Ce, white pigment, such as $TiO_2$, similar materials or a combination thereof are arranged on an inner (i.e. facing the supporting layer) surface of either of the glass layers. It has been established by using ray-tracing techniques that 85% of the total emitted light is guided by total internal reflections (TIR) through the glass/PVB structure. In the absence of outcoupling structures 116; 216 this light would eventually be transformed to heat (absorbed), and thus be essentially useless. In a system according to the inventive concept light emitted by a side-emitting LED package 104; 204 and trapped by TIR will eventually encounter an outcoupling structure 116; 216 and exit the system. In particular it is noted that the total emitted light from a single LED package will be distributed over several outcoupling structures, with the associated advantages described previously.

Note that the position of side-emitting LED packages 104; 204 and outcoupling structures 116; 216 does not have to be interrelated. The side-emitting LED packages 104; 204 will provide the light and the shape, size, form and distribution of the outcoupling structures 116, 216 will determine the visual appearance of the system.

Figure 5:
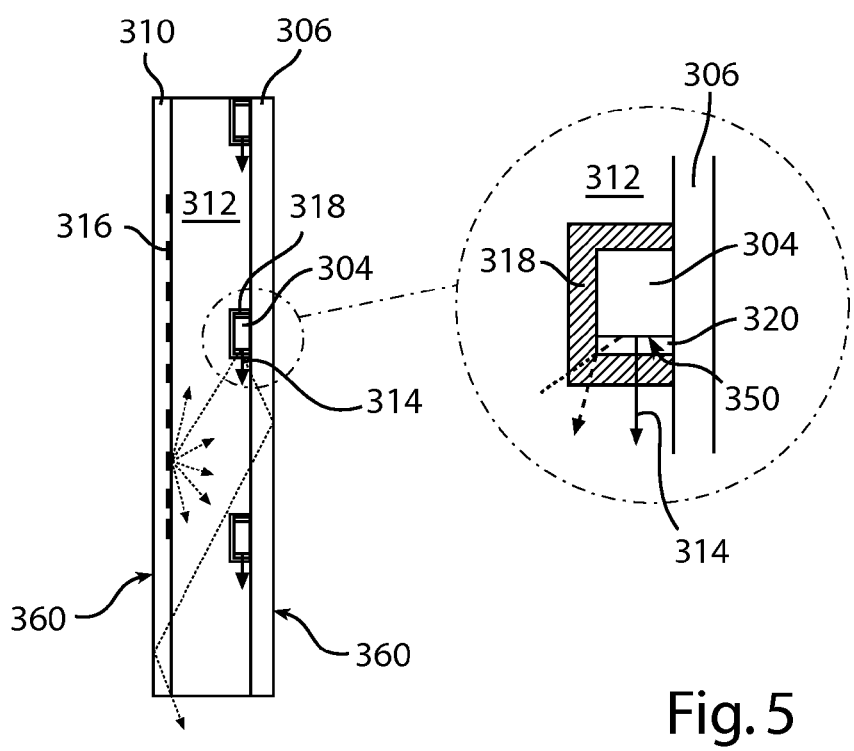
FIG. 5 is a schematic cross-sectional view of a third embodiment of the present invention.

FIG. 5 illustrates a third embodiment of the present invention. In this embodiment a cap 318 has been arranged over each side-emitting LED package 304 so as to create a thin air gap 320 between the light-emitting face 350 of the LED package 304 and the supporting layer 312. This construction results in that all light is captured in the glass/PVB/glass stack by TIR, which means that the outcoupling of light can be controlled to a higher degree. The cap 318 can be constructed in several different ways and by various transparent materials, such as PMMA, glass, or ceramic. The air gap 320 is generally very thin, in the order of 10-100 μm.

Figure 6:
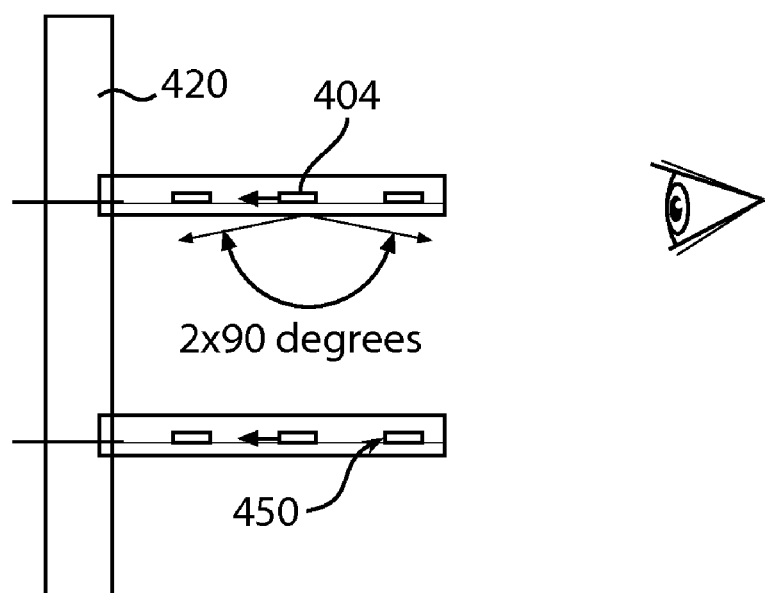
FIG. 6 is a schematic cross-sectional view of the application of an inventive system to shelves.

FIG. 6 shows an outline of a shelf system in which the inventive system has been used. Since the light-emitting faces 450 of the side-emitting LED packages 404 are facing the wall 420, there is no risk of direct light reaching a spectator, i.e. glare is eliminated.

Figure 7:
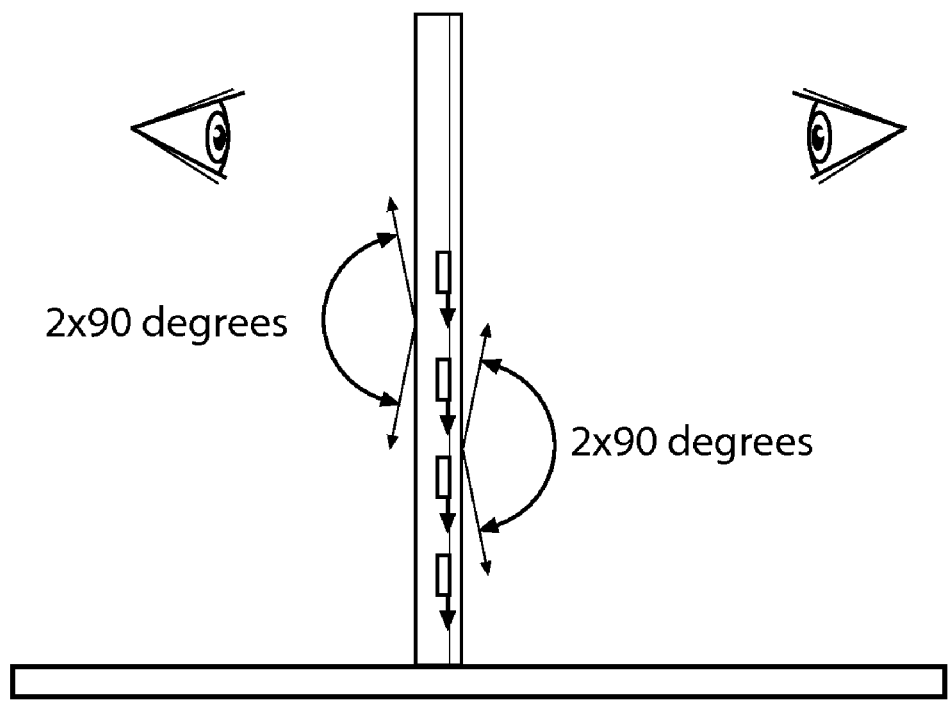
FIG. 7 is a schematic cross-sectional view of the application of an inventive system to separation walls/decorative walls.

FIG. 7 shows a decorative wall in which the inventive system has been used. A system in accordance with FIG. 7 will emit light to both sides.

The above applications illustrates the use of the invention to create virtual light sources for which the total area of the outcoupling structures is much greater than the area of the original LED package (by several orders of magnitude). In this way the brightness of the system is decreased dramatically (see eq. 2).

The inventive system is highly versatile and a few further examples follow. E.g. screen printed patterns of white dots on one or both glass layers (106, 110; 206, 210; 306, 310) are effective for outcoupling of light. However, other optical structures (e.g. refractive elements) can also be envisaged. A uniform light emitting wall can be designed by proper choice of the LED-array configuration (hexagonal, square, etc) and the dot size and density of the optical structures. The side-emitting LED packages 104; 204; 304; 404 may be white (phosphor converted) or colored (RGBA) or a mixture of various LED colors. The dot pattern can be printed over the whole glass surface or on only a part of the glass layers 106, 110; 206, 210; 306, 310. There is no need for overlap between the LED package position and the dot pattern.

When a viewer looks towards one of the two sides of the system (see e.g. FIG. 2) a light distribution can be calculated, composed of light coming directly from the LED packages 104 and of (indirect) light coming from the outcoupling structures 116. Now, a number of applications can be proposed, where only indirect light reaches the eye. This indirect light comes from a much larger surface (compared to the emitting surface of the LED packages) and has a brightness which can easily be tuned towards an acceptable/required level.

The system may also comprise a blue (or near-UV) light emitting LED packages combined with a phosphor pattern to generate white or colored light. To tune the CCT (color correlated temperature) of the light a mixture of phosphor (e.g. YAG:Ce) and white pigment (e.g. $TiO_2$) can be used. The outcoupling structures 116; 216; 316 are not limited to a regular white dot pattern (or phosphor pattern). Also white (or phosphor containing) stripes can be applied, resulting in virtual 2D light sources. The outcoupling structures 116, 216, 316 generally emit light towards both directions of the glass layers, and hence the system. To limit light emission to only one side, outcoupling structures 116; 216; 316 may be made by a metal pattern on the surface of the glass layers 106, 110; 206, 210; 306, 310 with a white reflecting layer following the same pattern on top.

The outcoupling structures 116; 216; 316 can equally well be arranged/distributed/dispersed in the supporting layer, an example being small spheres with a diameter of 10-100 times the wavelength of light and having a different refractive index than the PVB. The spheres will cause Mie-scattering and thus will couple the light out of the system. The control of the emulsion of scattering particles inside the supporting layer allows for either homogeneous or patterned illumination.

The invention described is relevant for separation walls, decorative walls, shelves, as well as for illumination systems in general.

The invention claimed is:

1. A LED-array system, comprising at least one side-emitting LED package arranged on a substrate and at least partially encapsulated in a supporting layer, the LED package having a light-emitting face configured to emit light substantially parallel to a surface of the substrate,
    means for supplying the LED package with a drive voltage, and
    at least one outcoupling structure for reflecting/scattering the emitted light out of the supporting layer,
        wherein the light-emitting face and the supporting layer are separated by an air gap therebetween.

2. The LED-array system according to claim 1, further comprising top layer arranged in such a way that it sandwiches said supporting layer between the top layer and the substrate.

3. The LED-array system according to claim 2, wherein the substrate and the top layer are made of glass and the supporting layer is made of PVB or a resin.

4. The LED-array system according to claim 2, wherein the outcoupling structures are arranged on a surface of the top layer, facing the supporting layer.

5. The LED-array system according to claim 1, wherein the outcoupling structures are arranged on a surface of the substrate facing the supporting layer.

6. The LED-array system according to claim 1, wherein the outcoupling structures are screen printed.

7. The LED-array system according to claim 1, wherein the outcoupling structures are selected from the group consisting of: luminescent ink; polymer particles containing luminescent dies; interference pigments; high index oxides; colored pigments; photochromic materials; particles with closed porosity and combination thereof.

8. The LED-array system according to claim 1, further comprising a transparent cap comprising PMMA, glass, or ceramic material and disposed over the LED package for providing the air gap.

* * * * *